T. GREGORY.
QUICK RELEASE DEVICE.
APPLICATION FILED JULY 7, 1919.
1,360,521. Patented Nov. 30, 1920.
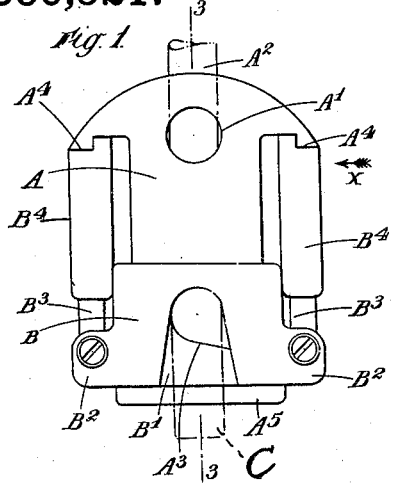
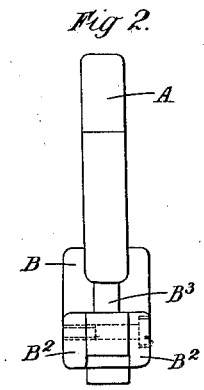
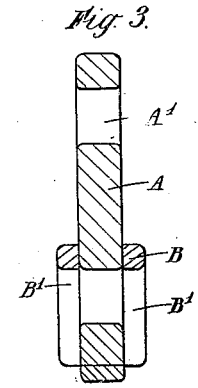
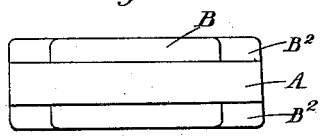
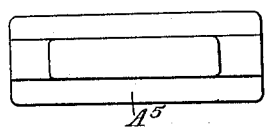
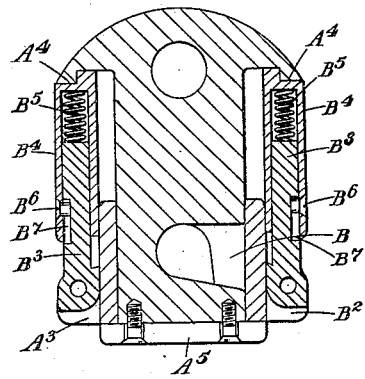
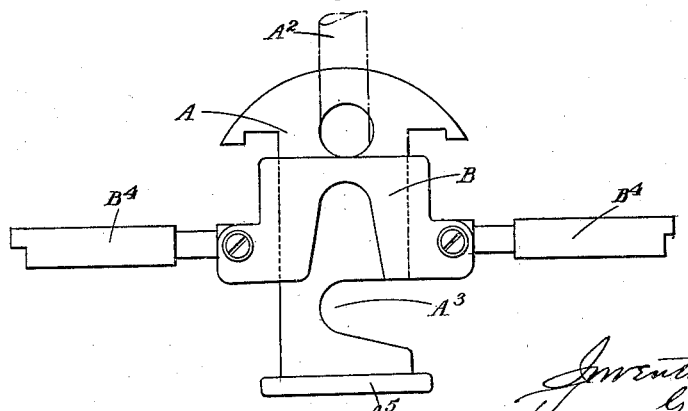

UNITED STATES PATENT OFFICE.

THOMAS GREGORY, OF NEW MALDEN, ENGLAND.

QUICK-RELEASE DEVICE.

1,360,521. Specification of Letters Patent. Patented Nov. 30, 1920.

Application filed July 7, 1919. Serial No. 309,025.

*To all whom it may concern:*

Be it known that I, THOMAS GREGORY, a subject of the King of Great Britain, residing at 79 Chestnut Grove, New Malden, in the county of Surrey, England, have invented certain new and useful Improvements in or Relating to Quick-Release Devices, of which the following is a specification.

This invention relates to quick release or coupling devices. The device according to this invention is particularly applicable for use by an aviator for attaching himself to a parachute but its application is not restricted to this purpose.

According to this invention the device comprises a member having a slot or aperture adapted to receive one of the parts to be coupled and a part slidable relatively to said member and adapted to close the entrance to said slot or aperture. The slidable part is preferably in the form of a sleeve surrounding the said member and spring locking means are provided for locking the slidable part to close the said slot or aperture. As hereinbefore mentioned the device is particularly adapted for use by an aviator for attaching himself to a parachute. In employing a parachute for example for dropping from an aeroplane, there is great liability for the aviator to be dragged along the ground on the completion of the descent. The parachute is usually attached to a harness on the aviator and to prevent the aviator being dragged along the ground as just referred to, it is desirable that the connection between the parachute and the aviator be made by a quick release device whereby he can disconnect himself from the parachute quickly and with certainty.

In order that the invention may be clearly understood and readily carried into effect the same will now be more fully described with reference to the accompanying drawings which show by way of example one form of the device suitable for use by an aviator in attaching himself to a parachute.

In the drawings:—

Figure 1 is an elevation of the device,

Fig. 2 is an elevation looking in the direction of the arrow X in Fig. 1,

Fig. 3 is a section on the line 3—3 in Fig. 1,

Fig. 4 is a view corresponding to Fig. 1 but in section,

Figs. 5 and 6 are top and under plan views respectively, and

Fig. 7 is a view similar to Fig. 1 but showing the parts displaced to allow of the release of the aviator from the parachute.

Referring to Fig. 1 A is a block of metal provided with a hole $A'$ through which a cord $A^2$ (shown in chain lines) is passed, this cord forming the attachment to the parachute. Sliding on the part A is a sleeve-like part B having two slots $B'$ in opposite faces as shown. The part A is provided with a lateral slot or aperture $A^3$ (Figs. 1, 4 and 7). With the part B in the position shown in Fig. 1 an opening, formed by the slots $A^3$ and $B'$, $B'$, is left through the sleeve B and part A through which a cord C (shown in chain lines) passes, this cord forming the attachment to the harness worn by the aviator. The rope C is of such length that when the aviator is descending by means of the parachute, the device is easily within his reach, that is to say it is about level with the chest of the aviator. Pivoted between pairs of lugs $B^2$ forming part of the slide B are two rods $B^3$ on which are slidable sleeves $B^4$. Interposed between the closed upper ends of the sleeves $B^4$ and the rods $B^3$ are spiral springs $B^5$. The upper ends of the sleeves $B^4$ are formed with shoulders which can engage projecting pieces $A^4$ on the head of the member A. To limit the movement of the sleeves $B^4$ on the rods $B^3$ screws $B^6$ are inserted in the sleeves, these screws entering slots $B^7$ on the rods $B^3$. To prevent the part B coming off the part A a plate $A^5$ is fixed by screws $A^6$ to the bottom of the part A.

The mode of employing the device in connection with a parachute is as follows:

The device being attached to the parachute by the cord $A^2$ and to the harness of the aviator by the cord C, the aviator on reaching or approaching within a few feet of the ground grasps the two sleeves $B^4$ depressing them against the action of the springs $B^5$, so as to clear the shoulders on the sleeves $B^4$ from the projections $A^4$ on the member A, and he then pulls the sleeves $B^4$ outward at the same time raising the part B on the part A to a position such as indicated in Fig. 7. The cord C is now free to slip out through the slot or aperture $A^3$ so that the aviator is released from the parachute.

The particular construction described is given merely by way of example it being obvious that the device may be constructed in forms other than that shown in the drawings, for example, the member A and sleeve-like part B may be of cylindrical instead of rectangular cross section.

Although the device is particularly applicable for use in releasing an aviator from a parachute it is obviously applicable for other purposes where it is necessary or desirable to employ a quick release coupling for connecting any two parts.

What I claim and desire to secure by Letters Patent of the United States is:—

1. A quick release coupling device comprising a member formed with a slot or aperture adapted to receive one of the parts to be coupled and a sleeve-like part around said member slidable relatively to said member and adapted to close the entrance to said slot or aperture to retain the said part to be coupled, the form and inclination of the sides of the slot being such that on withdrawing the sleeve-like part the said part to be coupled is entirely free.

2. A quick release coupling device comprising a member formed with a slot or aperture adapted to receive one of the parts to be coupled, a sleeve-like part around said member and slidable relatively to said member and pivoted spring locking devices adapted to lock the slidable part in such a position as to close the entrance to said slot or aperture to retain the said part to be coupled, the form and inclination of the sides of the slot being such that on withdrawing the sleeve-like part the said part to be coupled is entirely free.

3. A quick release coupling device comprising a member formed with a slot or aperture adapted to receive one of the parts to be coupled, a sleeve-like part around said member and slidable relatively to said member and a telescopic member pivoted to said sleeve-like part, its free end being adapted to engage said member to lock said slidable part in such position as to close the entrance to said slot or aperture to retain the said part to be coupled, the form and inclination of the sides of the slot being such that on withdrawing the sleeve-like part the said part to be coupled is entirely free.

THOMAS GREGORY.